No. 665,411. Patented Jan. 8, 1901.
A. W. DAWSON.
HARVESTER REEL.
(Application filed Mar. 21, 1900.)
(No Model.) 3 Sheets—Sheet 1.
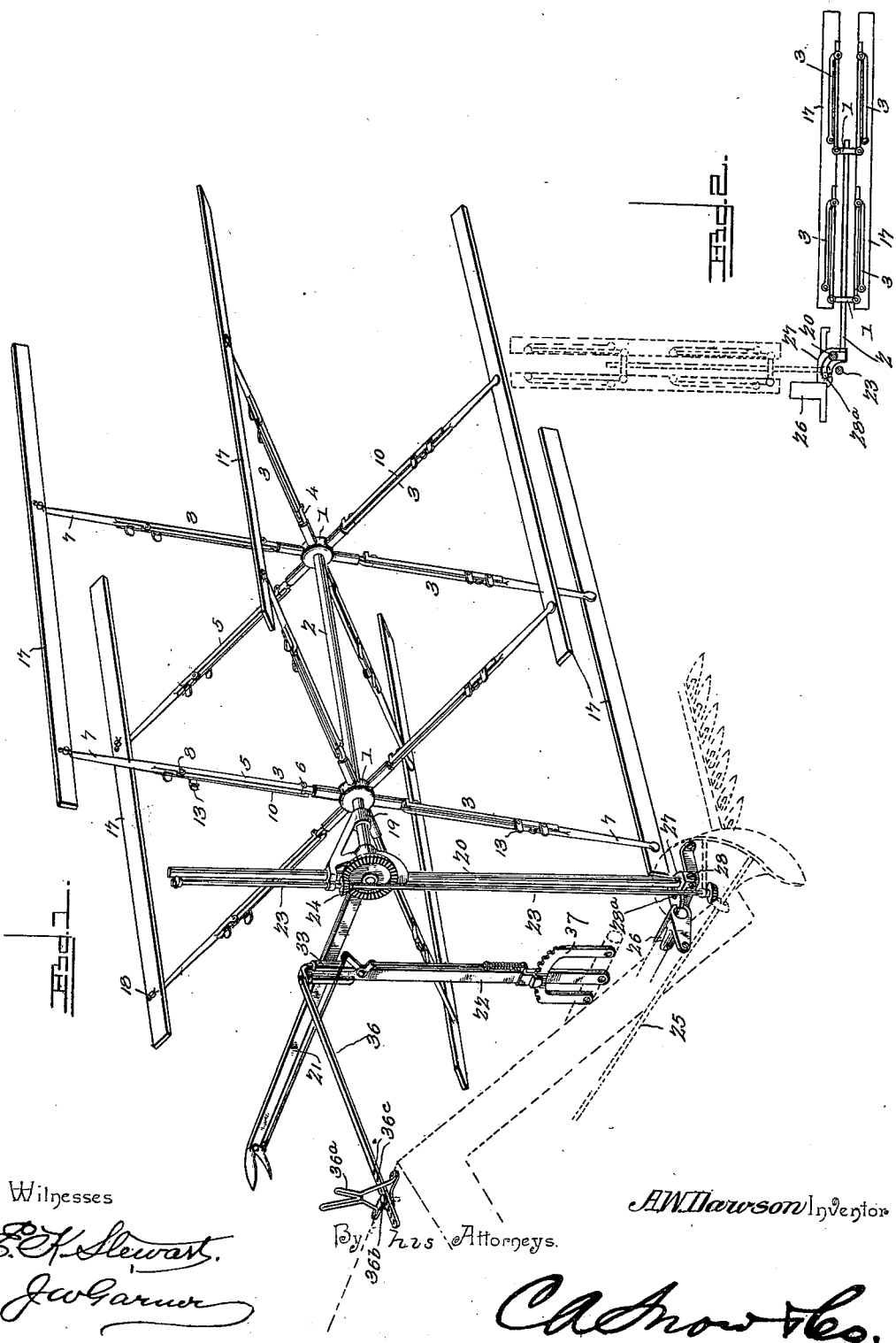
Witnesses
E. K. Stewart
J. W. Garner
A. W. Dawson Inventor
By his Attorneys
C. A. Snow & Co.

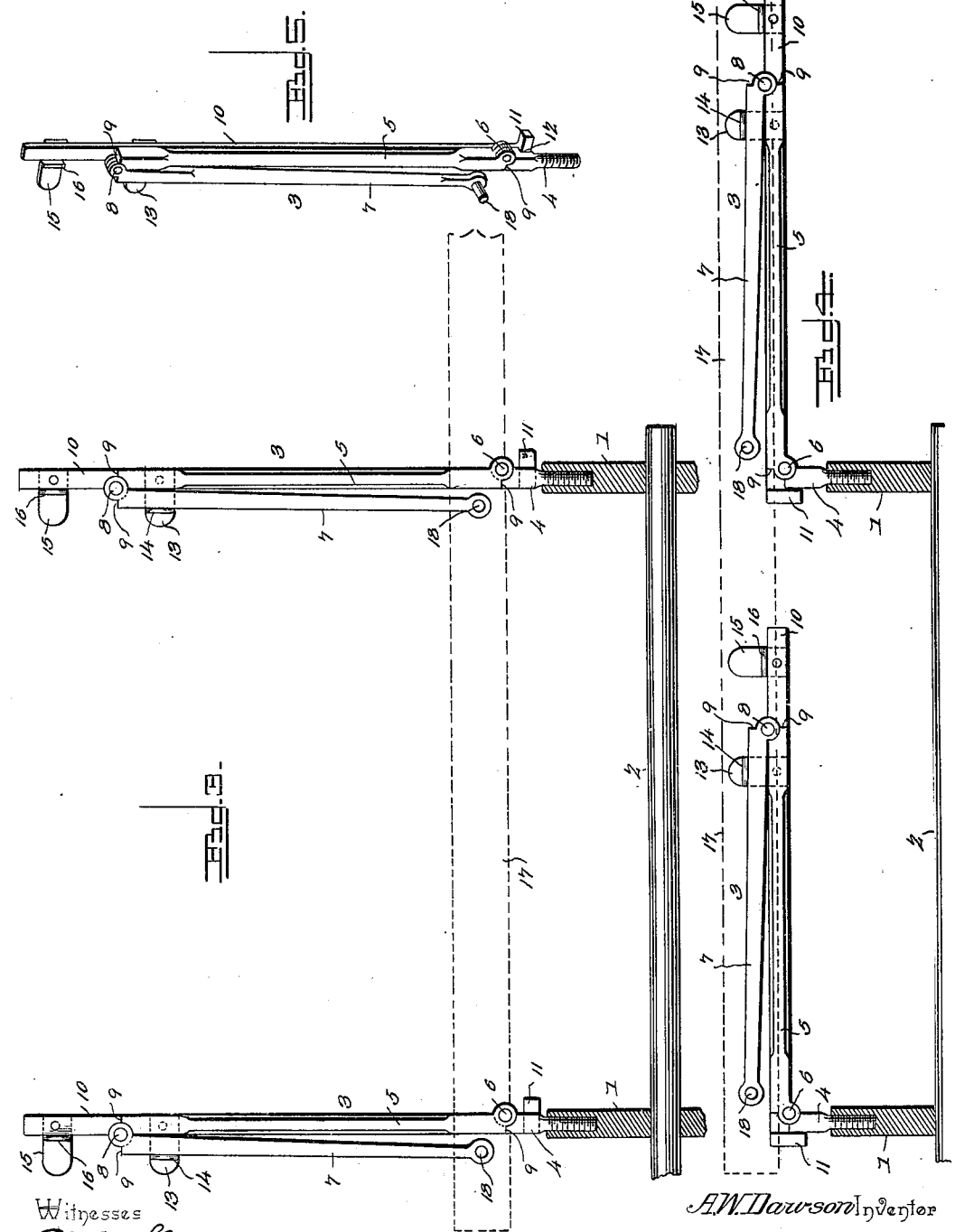

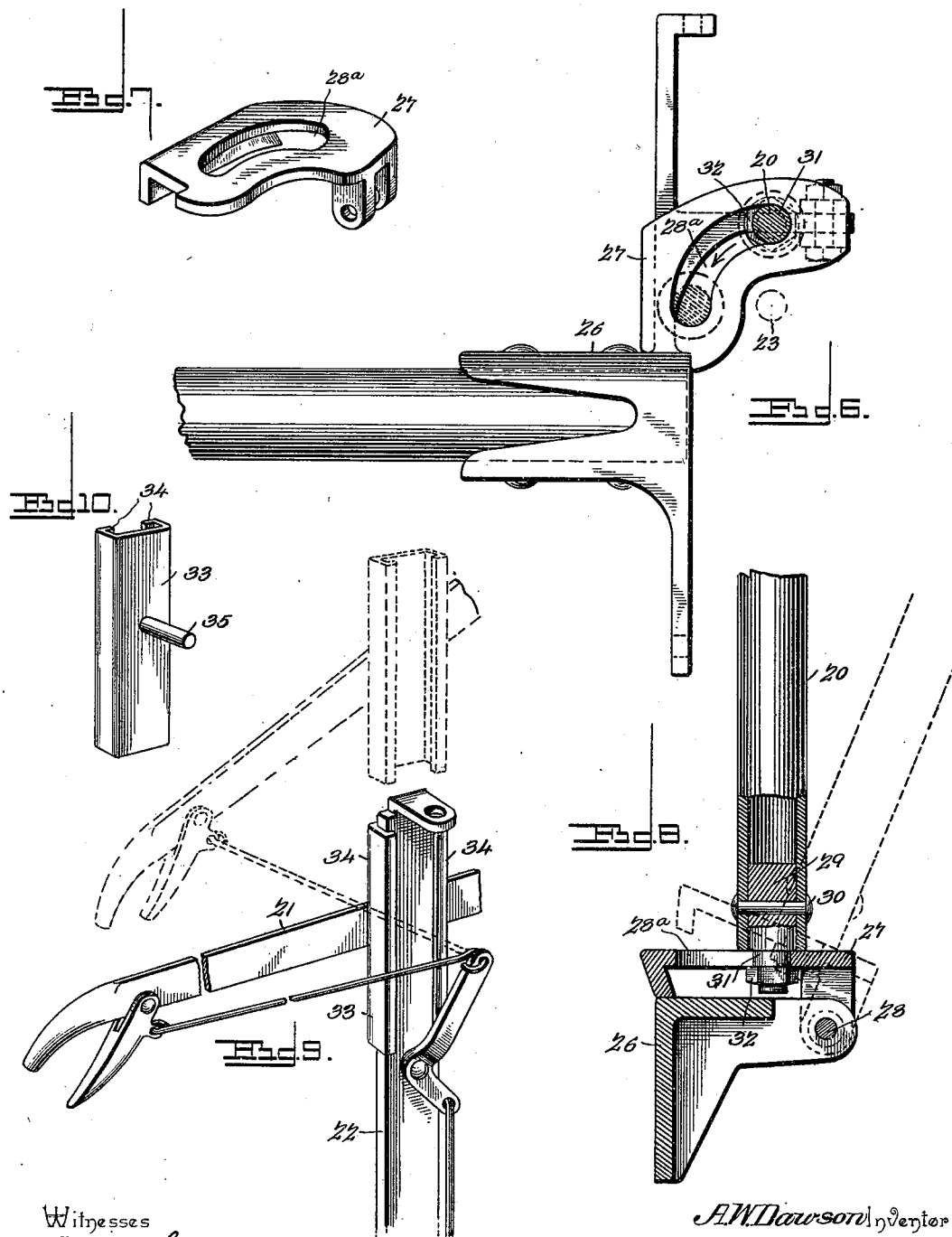

UNITED STATES PATENT OFFICE.

ALVA W. DAWSON, OF WINCHESTER, ILLINOIS, ASSIGNOR OF ONE-HALF TO T. B. DAWSON, OF SAME PLACE.

HARVESTER-REEL.

SPECIFICATION forming part of Letters Patent No. 665,411, dated January 8, 1901.

Application filed March 21, 1900. Serial No. 9,559. (No model.)

*To all whom it may concern:*

Be it known that I, ALVA W. DAWSON, a citizen of the United States, residing at Winchester, in the county of Scott and State of Illinois, have invented a new and useful Harvesting-Reel, of which the following is a specification.

My invention is an improved harvester-reel adapted primarily for use on a harvester of the class in which the platform is hinged to the frame of the grain-elevator and adapted to be swung to a vertical position, and thereby folded to reduce the size of the harvester and render the same compact and adapt it to be stored in a comparatively small space when the harvester is not in use.

One object of my invention is to provide a reel which is adapted to be compactly folded when not in use.

A further object of my invention is to provide a reel-standard and connections whereby the reel is adapted to be swung, when folded, to a position at right angles to its operative position and transversely disposed on the harvester between the grain-elevator and the platform when the latter is folded or turned to a vertical position.

A further object of my invention is to provide means whereby the lever for adjusting the reel may be readily unshipped from its supporting-standard to permit the folded reel to be swung rearward on the harvester.

With these and other objects in view my invention consists in the peculiar construction and combination of devices hereinafter fully set forth, and pointed out in the claims.

In the accompanying drawings, Figure 1 is a perspective view of a harvester-reel and its operating connections embodying my improvements, a portion of the harvester being indicated in dotted lines. Fig. 2 is a diagrammatic top plan view of the same. Fig. 3 is a detail elevation, partly in section, showing the reel-shaft, the spider-hubs thereon, and the jointed folding radial arms. Fig. 4 is a similar view of the same when completely folded. Fig. 5 is a detail perspective view of one of the jointed folding reel-arms, showing the two outer sections thereof folded together. Fig. 6 is a detail top plan view of the supporting-casting and hinged plate for the reel-standard, the latter being indicated in section. Fig. 7 is a detail perspective view of the hinged supporting-plate for the reel-standard. Fig. 8 is a detail vertical sectional view through the supporting-casting, the hinged supporting-plate, and the reel-standard. Fig. 9 is a detail perspective view of the upper portion of the standard which supports the reel-adjusting lever, a portion of said lever, and the sliding supporting-plate to which the latter is fulcrumed and which serves to connect said lever to said standard and permit said lever to be readily unshipped therefrom. Fig. 10 is a detail perspective view of said sliding fulcrum-plate.

In the construction of my improved harvester-reel I provide a pair of hub-spiders 1, which are secured on the reel-shaft 2 and adapted to rotate therewith. The reel-arms 3 are each formed of a short inner section 4, an intermediate section 5, which is hinged thereto, as at 6, and permitted to be turned thereon in one direction, and an outer section 7, which is hinged to the outer end of the intermediate section, as at 8, and adapted to be turned or folded on said intermediate section in the reverse direction. The said hinged sections of the reel-arms are provided at their respective ends with shoulders 9, which are disposed on one side of their respective pivots, said shoulders contacting with each other when the said reel-arms are extended in a straight line. To the intermediate section 5 of each reel-arm, on one side thereof, is secured a stiffening-bar 10, which is preferably a flat spring-bar and the ends of which extend beyond the joints of the reel-arm. Said stiffening spring-bar is provided at its inner end with a right-angled stop 11, which is adapted to engage a shoulder 12, formed in the proximate side of the inner section 4 of the reel-arm, when the intermediate section 5 is extended in line with the said inner section 4, as shown in detail in Figs. 3 and 5, and when the said intermediate section 5 is turned on its pivot or hinge to a position parallel with the reel-shaft and at right angles to the inner section 4 said stop 11 bears against one side of the said section 4, as illustrated in detail in Fig. 4. The spring-bar 10 is provided at a suitable distance from its outer end at a point within the joint between the sections 5 7 of the reel-arm with a right-angled lug 13, which bears against the outer side of the section 7 when the latter is folded against the section 5, as shown in Fig. 3, and the said lug is provided on its inner side with a stop-flange 14, which when the said section 7 is thus folded against the said section 5 engages the outer side of said section 7 and locks the same in said position. The said spring-bar 10 is further provided near its outer end at a point beyond the hinged joint 9 with a laterally-extending lug 15, which is similarly provided with a stop-flange 16, which is adapted to engage the opposite side of the section 7 when the latter is extended outward in line with the section 5 and lock the same in said extended position. It will be readily understood that as the bar 10 is a spring-bar centrally fastened to the intermediate section 5 and free at its ends the stops at the ends of said spring-bar may be readily disengaged from the sections 4 7 of the reel-arm to permit said reel-arm to be folded or extended as may be required and to lock said jointed sections of the reel-arm in position when the same are folded.

The reel-bars 17 are pivotally connected to the outer ends of the outer sections of the jointed reel-arms, as at 18, and it will be readily understood that by means of the hinged or pivotally-jointed members of the reel-arm and the pivotal connections between the outer sections of the latter and the reel-bars said reel-bars when said reel-arms are folded inward are disposed within a short distance of the reel-shaft, and hence the reel is adapted to be compactly folded when the same is not in use, so as to be readily disposed out of the way when stored.

The bearing and supporting bracket 19 at the inner end of the reel-shaft, the vertical standard 20, which supports said bracket and on which said bracket is adapted to be moved, so as to adjust the reel with relation to the standing grain, the lever 21 for adjusting said reel and the supporting-standard 22 for said lever, and operating counter-shaft 23, geared to the reel-shaft, as at 24, and to a power-shaft, as at 25, are not, broadly, of my invention, and the general features thereof are familiar to those skilled in harvesting machinery of this class; but in the operative organization of my improved folding reel I have provided certain novel constructions and combinations whereby the reel may be moved forward by tilting or inclining the standard 20 and correspondingly tilting or inclining the counter-shaft 23 and lever-standard 22 when the reel is in operation in connection with the harvesting-machine and whereby when the reel is folded compactly the same may be swung rearwardly over the harvester-platform to a position at right angles to its operative position and between the grain-elevator and the harvester-platform when the latter is folded upward to adapt the harvesting-machine to be compactly disposed for storage or shipping purposes, which novel construction and combination of devices I describe as follows:

To the supporting-casting 26, which constitutes a portion of the framing of the harvesting-machine and which *per se* is not of my invention, is hinged or pivotally connected a supporting-plate 27, as at 28, the pivotal connection between said plate and said supporting-casting being at the front end of said plate, whereby the same may be turned forwardly from the supporting-casting to incline the reel-standard 20, which is attached to said plate, as presently described, to any appropriate angle when adjusting the reel. The said plate is substantially of quadrant form in top plan, as shown in Fig. 6, and is provided with a quarter-circular guide-slot 28$^a$, the latter being concentric with the counter-shaft 23, which is adapted in the usual manner known to those skilled in the construction of machines of this class to be tilted and adjusted with the reel-standard and maintained at all times in parallel relation thereto.

In the lower end of the reel-standard 20 is a spindle 29, which is secured therein by a transverse bolt or rivet, as at 30, the depending shank 31 of said spindle being disposed in the curved slot 28 and guided and supported and adapted to be moved therein, hence adapting the reel-standard for axial adjustment in said supporting-guide in a curved line, which is concentric with the operating counter-shaft 23 of the reel. A nut or bur 32 is screwed to the lower threaded end of the spindle, which forms the base of the reel-standard, and said nut or bur serves to secure said reel-standard firmly on the supporting-plate 27, while permitting said standard to be axially adjusted on said supporting-plate, as hereinbefore described. It will be understood that by thus adapting the reel-standard to be axially adjusted in a curved line concentric with the operating counter-shaft 23, the latter not being capable of axial adjustment, the reel when folded is adapted to be swung rearward over the harvester-platform and disposed at right angles thereto, as and for the purpose hereinbefore described. To enable the reel to be thus disposed, it is, however, necessary to provide means to permit the adjusting-lever 21 to be readily unshipped from the lever-standard 22, and to accomplish this end I have devised a plate 33, which is provided on one side with parallel guides and keepers 34, whereby the said plate may be attached to said lever-standard and is adapted to be moved endwise on said lever-standard and to be entirely withdrawn from the upper end of said lever-standard by a simple movement of the lever 21, which is fulcrumed to the said plate, as at 35, on a stud that projects from the side of said plate opposite the guides and keepers 34. Hence the plate 33 and the lever 21, to which it is attached, may be readily drawn clear of the end of the standard 22 to unship the said lever 21, the brace-bar 36 being first detached from the upper end of said standard 22, as shown in Fig. 9. When thus unshipped from the standard 22, said lever 21 may be folded against the reel-standard 20, and said standard 22 and its hinged or pivotally-connected brace-bar 36 may be folded or turned to a substantially horizontal position on the machine-frame.

The connection between the brace-bar 36 and the machine is the usual bolt, pin, or key 36$^b$, operating in one of the series of adjusting-openings 36$^c$, with which the brace-bar is provided, as is usual in similar devices in machines of this class, to enable the standard 20 and counter-shaft 23 to be tilted forward or rearward, as may be required to adjust the reel, and to be secured when thus tilted.

A supporting-bracket 36$^a$, the upper side of which is forked, as shown, is secured at a suitable point on the frame of the harvesting-machine and adapted to receive the lever 21 and support the same when the harvester-reel is transversely disposed on the harvester and the said lever 21 is disposed parallel with the front side of the harvester.

A segment-plate 37, such as is universally used in connection with a hand-lever in machines of this class, is employed to lock the hand-lever 22. Said segment-plate and said hand-lever may be attached to any appropriate portion of the harvester-frame, as will be apparent to those skilled in machines of this class. Usually they are attached to the bar which supports the seat for the driver.

Having thus described my invention, I claim—

1. In a harvester-reel, the combination of a jointed reel-arm adapted to be folded, a spring-arm secured to one section of the jointed reel-arm and overlapping the joints thereof and having stops to engage and lock the sections of the jointed reel-arm, substantially as described.

2. In a harvester-reel, the combination with a counter-shaft, a reel-standard carrying the reel, the shaft of which is geared to and driven by the counter-shaft, and a supporting element for said reel-standard having a curved guide, concentric with the counter-shaft, in which the base of said standard is secured and adapted to move, for the purpose set forth, substantially as described.

3. In a harvester-reel, the combination with a jointed reel-arm, an overlapping locking and stiffening member forming a spring and having stops to engage and lock the sections of the jointed reel-arm, substantially as described.

4. In a harvester-reel, the combination with the reel-shaft, of the spider-hubs, the jointed reel-arms, the overlapping locking and stiffening members on said jointed reel-arms, each stiffening member forming a spring and having stops to engage and lock the sections of the jointed reel-arms for the purpose set forth, and the reel-bars pivotally connected to the outer ends of said reel-arms, substantially as described.

5. In a harvester-reel, the combination with a jointed reel-arm comprising an inner an intermediate, and an outer section, said sections hinged or pivotally jointed together and having coacting shoulders adapted to contact when said sections are extended, and means to lock said sections together, substantially as described.

6. In a harvester-reel, the combination of a supporting element, a plate hinged thereto, a reel-standard mounted on said hinged plate, a curved supporting-guide, whereby said reel-standard is adapted for movement in a curved line, and a counter-shaft geared to said reel, and to which said curved standard-guide is concentric, substantially as described.

7. In a harvester-reel, the combination of a reel-supporting standard and means whereby the same may be turned to dispose the reel transversely on the harvester, an adjusting-lever for the reel, a standard for said adjusting-lever, and means whereby said adjusting-lever may be unshipped from said standard substantially as described.

8. In a harvester-reel, the combination of a reel-supporting standard and means whereby the same may be turned to dispose the reel transversely on the harvester, an adjusting-lever for the reel, a standard for said adjusting-lever, and a plate adapted to be readily attached to and unshipped from said lever-supporting standard, substantially as described.

In testimony that I claim the foregoing as my own I have hereto affixed my signature in the presence of two witnesses.

ALVA W. DAWSON.

Witnesses:
T. J. PRIEST,
JOHN B. LASHMETT.